US008631956B2

(12) United States Patent
Dowd

(10) Patent No.: US 8,631,956 B2
(45) Date of Patent: Jan. 21, 2014

(54) REUSABLE, COMBINED MULTI-PART PRODUCT SHIPPING BOX AND DISPLAY TRAY

(76) Inventor: Fred Dowd, Princeton, MA (US)

(*) Notice: Subject to any disclaimer, the term of this patent is extended or adjusted under 35 U.S.C. 154(b) by 498 days.

(21) Appl. No.: 12/640,246

(22) Filed: Dec. 17, 2009

(65) Prior Publication Data
US 2010/0147840 A1    Jun. 17, 2010

Related U.S. Application Data

(60) Provisional application No. 61/138,220, filed on Dec. 17, 2008.

(51) Int. Cl.
*B65D 6/28* (2006.01)
*B65D 6/00* (2006.01)
*B65D 8/14* (2006.01)
*B65D 21/00* (2006.01)

(52) U.S. Cl.
USPC ............ 220/6; 220/4.01; 220/4.28; 220/666; 206/503

(58) Field of Classification Search
USPC ............ 220/4.01, 6, 666, 4.28; 206/600, 503
See application file for complete search history.

(56) References Cited

U.S. PATENT DOCUMENTS

| | | | | |
|---|---|---|---|---|
| 3,986,659 A | * | 10/1976 | Vajtay | 229/125.17 |
| 4,782,972 A | * | 11/1988 | Wenkman et al. | 220/4.28 |
| 4,785,957 A | * | 11/1988 | Beck et al. | 220/4.28 |
| 5,332,088 A | | 7/1994 | Schreiber | |
| 5,829,595 A | * | 11/1998 | Brown et al. | 206/600 |
| 6,024,223 A | * | 2/2000 | Ritter | 206/600 |
| 6,257,484 B1 | | 7/2001 | Dowd | |
| 6,705,515 B2 | | 3/2004 | Dowd | |
| 6,926,192 B1 | | 8/2005 | Dowd | |
| 2007/0272699 A1 | * | 11/2007 | Girault | 220/666 |

* cited by examiner

*Primary Examiner* — Anthony Stashick
*Assistant Examiner* — Madison L Poos
(74) *Attorney, Agent, or Firm* — Mirick, O'Connell, DeMallie & Lougee, LLP

(57) ABSTRACT

A reusable combined multi-part product shipping box and display tray. There are two generally rectangular trays, each defining four sides, with four barrier portions projecting upward from each tray proximate its edges, one barrier portion at about the center of each of the sides, and four corner posts, one projecting up from each corner of the tray. There is also a generally rectangular sleeve defining four sides and four corners, and open ends that are about the same size and shape as the trays, the sleeve adapted to engage with the trays to close its open ends and form a shipping container, the sleeve adapted to sit on the tray inside of and up against the barrier portions, with each corner of the sleeve located outside of and against a corner post, such that the sleeve is tightly engaged with the trays.

9 Claims, 7 Drawing Sheets

REUSABLE, COMBINED MULTI-PART PRODUCT SHIPPING BOX AND DISPLAY TRAY

CROSS-REFERENCE TO RELATED APPLICATION

This application claims priority to U.S. Provisional Patent Application Ser. No. 61/138,220, entitled "Reusable, Combined Multi-Part Product Shipping Box and Display Tray," filed on Dec. 17, 2008. The entire contents of the priority application are expressly incorporated by reference herein.

FIELD OF THE INVENTION

This invention relates to a box.

BACKGROUND OF THE INVENTION

Bananas currently and historically have been shipped in a corrugated paper box consisting of a double wall Half Slotted Container (HSC) body covered by a single wall HSC full depth telescoping cover. These paper boxes are typically fabricated local to the banana plantations where they are assembled on a box-forming machine or by hand at the packing sheds on the banana plantations. The double wall bottom of the box is formed, in a secondary operation, and then packed with the bananas inverted or crown up to minimize transportation damage. Another box-making machine or individual forms the single wall top of the box which is then slid over the bottom of the box to the full depth of the container. When completed, the bananas are protected by the combined wall thicknesses in a paper box that has triple thick sidewalls, double wall bottom flaps and single wall top flaps.

The finished box is very expensive, typically over $1.25 per box and gets thrown out at the store level. It is a one-time use shipping container that generates about 2.5 pounds of waste for each 40 pound box of bananas.

After packing in boxes, the bananas are loaded into refrigerated containers and shipped to market. Another mode of transport to market is when the boxes of bananas are loaded into the hold of a ship without the container, just packed on pallets. With either method, upon arrival at port the bananas are shipped to ripening companies in various markets where they are ripened by a gas process. After the bananas are ripened, they are shipped to the stores.

At the store level, store personnel have to manually unpack each box of bananas and put them on display on store shelves, crown down, for customers to view and purchase. Accordingly, either the ripening supplier or the store personnel have to invert the cases or bunches of bananas by hand prior to lifting each bunch out and putting them on a display stand. Bananas are a high volume retail item. The unpacking and handling of bananas at the store level is very time consuming and labor intensive, costing the supermarkets labor and wasted time.

SUMMARY OF THE INVENTION

The inventive reusable combined multi-part product shipping box and display tray accomplishes the following advantages.

The container can be used to ship bananas, other produce, or other goods, multiple times. The invention thus reduces the environmental impact of shipping millions of cases of bananas to market. The invention reduces solid waste, energy consumption and greenhouse gases by approximately 60% when compared to the disposable paper box system described above.

The inventive container also greatly reduces the costs associated with shipping. The paper box described above currently costs over $1.25 per unit. The inventive container can decrease the cost per shipping cycle to approximately $0.20.

The inventive three-part shipping container eliminates the in-store labor associated with unloading each case of bananas by hand. This allows the ripening supplier to invert each case of bananas prior to sending them to the store. Alternatively, the store personnel can invert an entire case at a time, place the case in the display area, remove the straps and lift the top tray and sleeve off the case, and the bananas are ready for display on the lower tray. This allows an entire tray of bananas to be displayed for sale with no further handling. A huge reduction of labor is thus achieved.

The inventive container can be used for almost any other merchandise such as floral products that require lightweight, flexible display shippers. The size, strength and structure of the container can be readily modified as desired to suite the product being shipped. It can be customized to each specific item.

The invention features a reusable combined multi-part product shipping box and display tray. There are two generally rectangular trays, each defining four sides, with four barrier portions projecting upward from each tray proximate its edges, one barrier portion at about the center of each of the sides, and four corner posts, one projecting up from each corner of the tray. There is also a generally rectangular sleeve defining four sides and four corners, and open ends that are about the same size and shape as the trays, the sleeve adapted to engage with the trays to close its open ends and form a shipping container, the sleeve adapted to sit on the tray inside of and up against the barrier portions, with each corner of the sleeve located outside of and against a corner post, such that the sleeve is tightly engaged with the trays.

The trays are preferably made of plastic. The trays preferably define an opening just inside of each post and that is sized and shaped to accept an identical post of another tray, to allow nesting of the trays. The sleeve is preferably made of corrugated plastic, and foldable into a flat form. The posts are preferably tapered from top to bottom. The bottom of the posts preferably defines a wall portion that is essentially perpendicular to the top of the tray. The posts preferably include two sections at essentially ninety degrees to one another to form an "L" shaped configuration, one such section located on each of the two adjacent sides of the tray, so that each post engages with the two sides of the sleeve that meet at a corner of the sleeve.

BRIEF DESCRIPTION OF THE DRAWINGS

A non-limiting embodiment of the invention is shown in the drawings, in which.

the Figure does not shown the removable bands or other devices used to hold the trays and sleeve together after the box has been filled.

Figure 1:
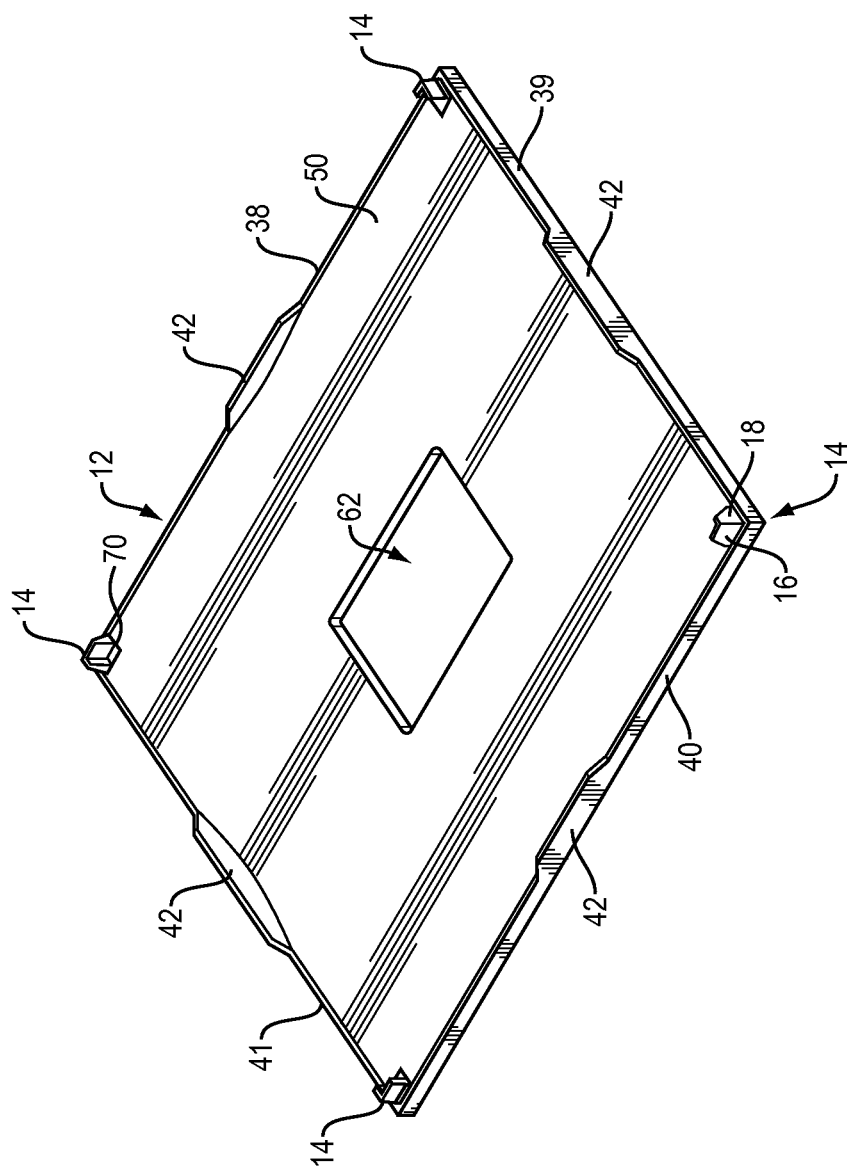
FIG. 1 is a top perspective view of an embodiment of a tray for the inventive box.
Figure 5:
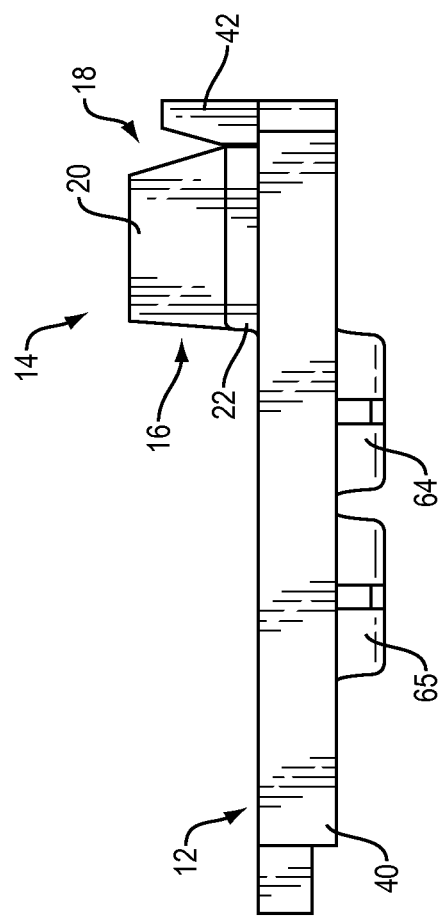

FIG. 5 is an enlarged side view of one corner of the tray of FIG. 1, showing the post and barrier detail.

Figure 2:
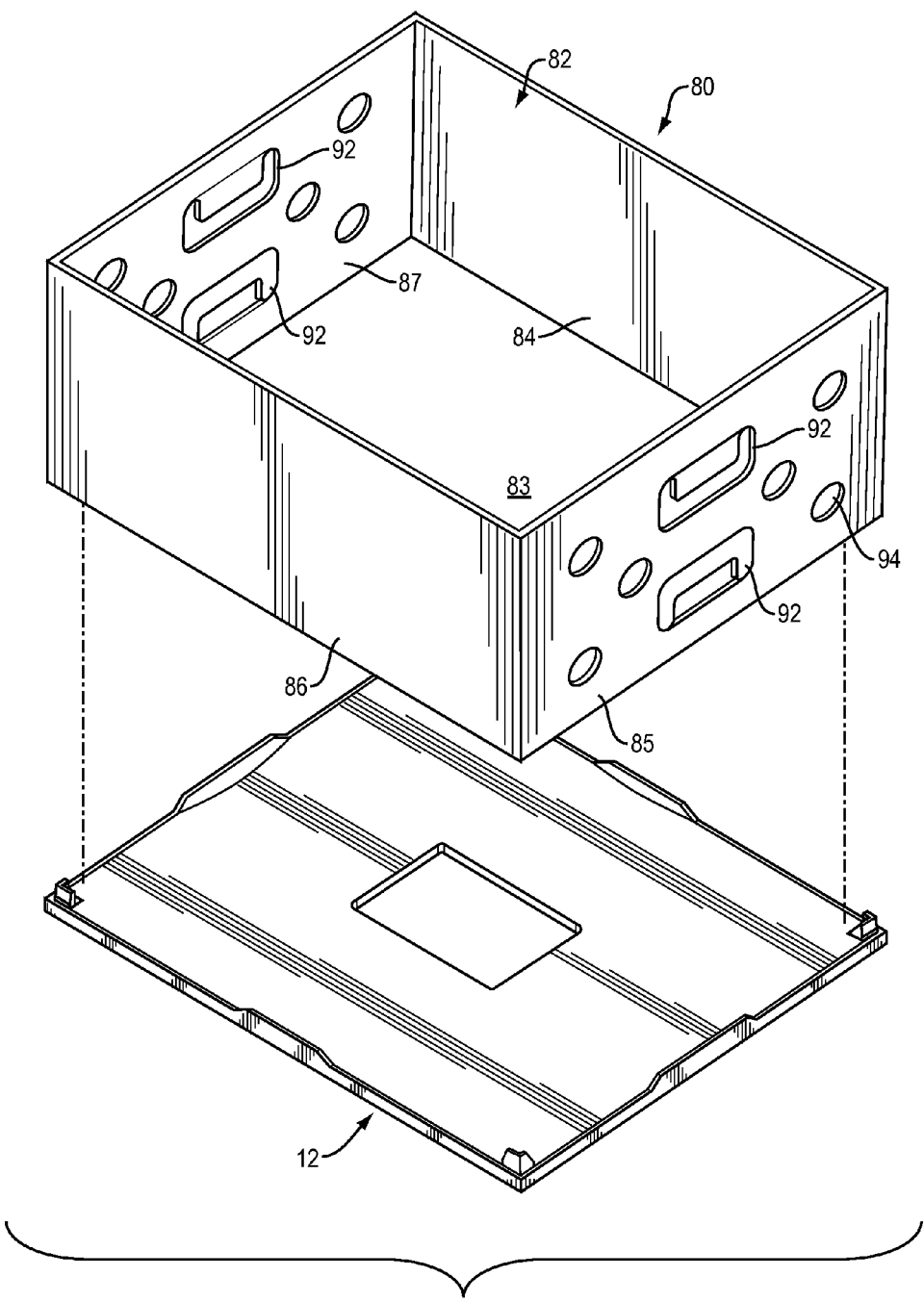
FIG. 2 is an exploded view of a sleeve for the inventive box in the process of being placed on the tray of FIG. 1.
Figure 3:
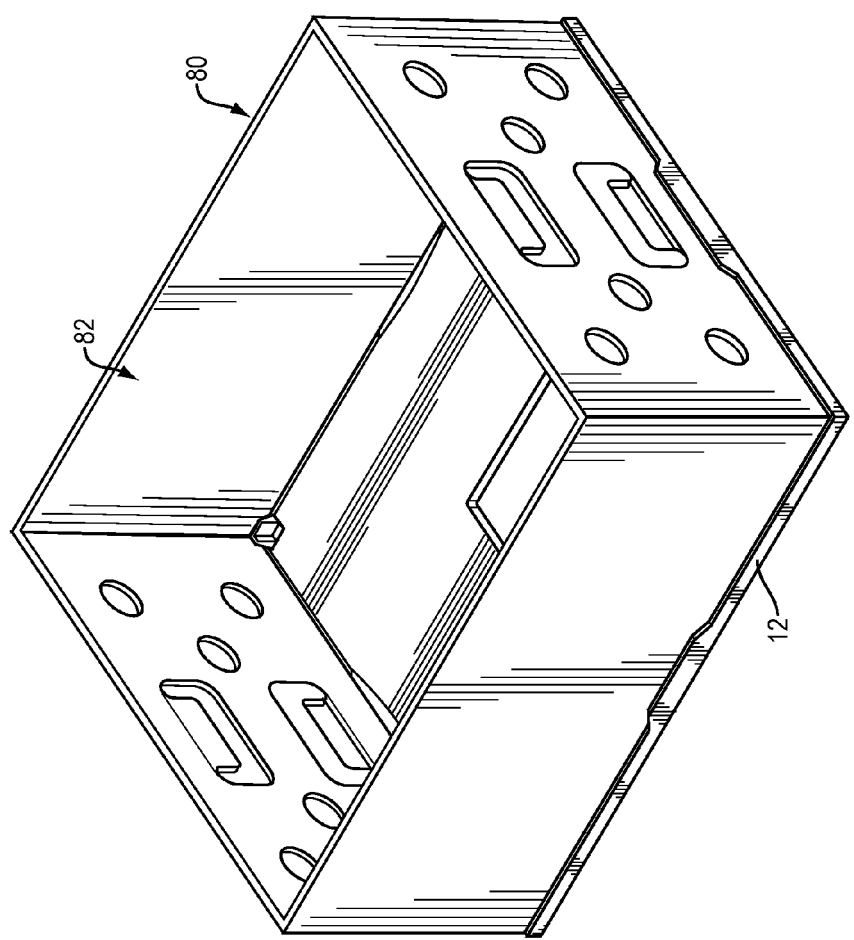
FIG. 3 is an assembled view of the sleeve and tray of FIG. 2, illustrating the partially-assembled box ready to be filled with merchandise (such as bananas) that will be shipped in the box.
Figure 4:
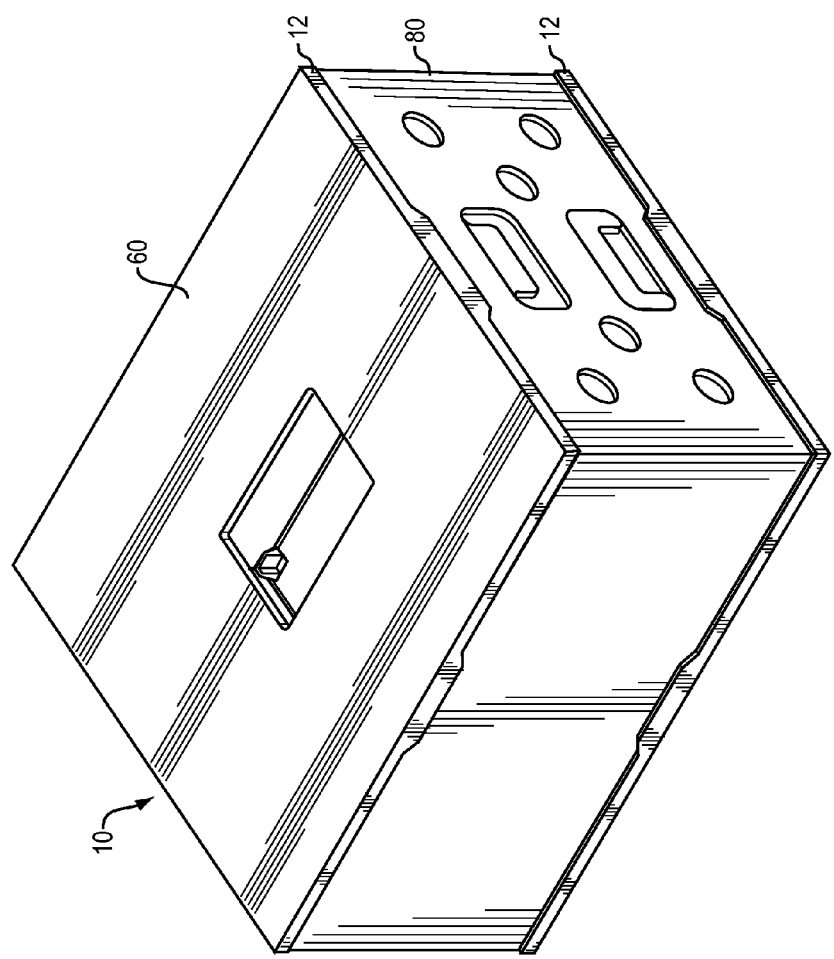
FIG. 4 shows the box of FIG. 1-3 fully assembled, with a second tray covering the open top of the assembly of FIG. 3.
Figure 6:
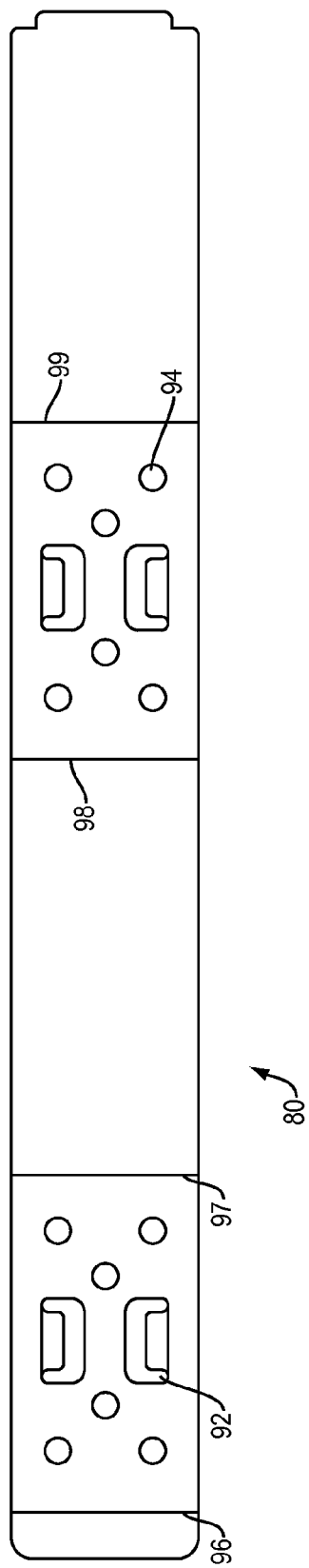

FIG. 6 is a top view of the die-cut blank used to make the sleeve shown in FIG. 2-4 (detailing relevant dimensions of the preferred embodiment in inches).

Figure 7:
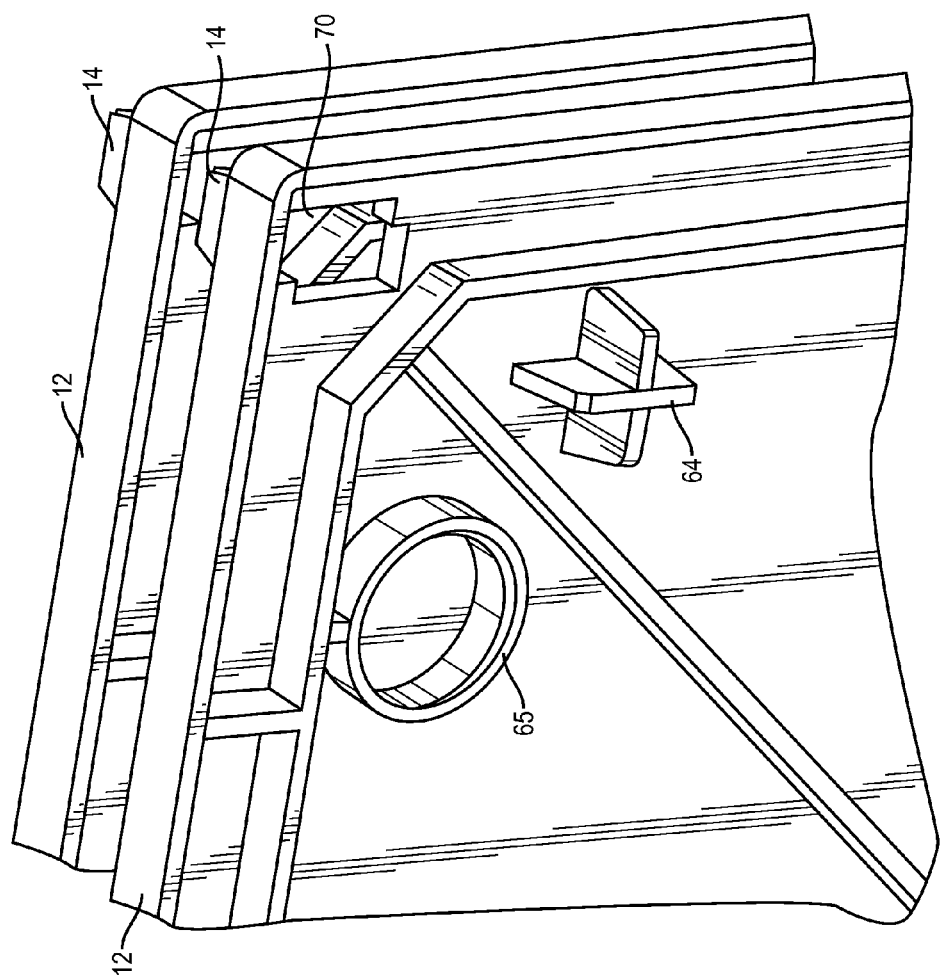

FIG. 7 is an enlarged view of the undersides of one corner of two of the preferred embodiment of the trays shown in FIGS. 1-5, detailing the manner in which such trays nest for storage and shipment.

DETAILED DESCRIPTION OF THE PREFERRED EMBODIMENT OF THE INVENTION

One container or box consists of two identical, injected molded trays, and one corrugated plastic sleeve that folds flat to minimize the storage and shipping space required once the box is broken down into its three parts.

The trays are lightweight and strong. The trays are nestable for condensed return freight efficiencies. Also, they include corner posts that help to align the corrugated plastic sleeve and locate the sleeve snugly on the tray. The corner posts include a tapered entry which transitions to a vertical 90-degree wall, which helps to lock the sleeve into position and pulls the sleeve sidewalls into a tight, rigid position for improved sleeve (container sidewall) stacking strength.

The trays further include vertical projections or barriers projecting upward from each of the four edges of the tray. These barriers inhibit the sidewalls of the sleeve from expanding beyond the external perimeter of the tray. The barriers are preferably located centered on each of the four sides of the tray, at or close to the edges of the tray. The sleeve sits inside these barriers and rests up against them by the weight of the product pushing against the sleeve sidewalls.

The trays have ventilation holes in the center for two reasons: weight reduction and for cooling and gas applications when pallets are shipped in the holds of ships. The cooling gases come up from the floor of the pallet. Also, there can be various additional holes and cutouts in the tray for weight reduction. Weight control of the combined two trays and sleeve is important since a full truckload of bananas approaches the legal limit of weight a truck can safely carry. Any heavier than existing paper boxes, and shippers would have to leave product off the trucks which would affect the economics.

The sleeve is preferably made from 5 mm corrugated polypropylene, but could be made from any malleable material such as corrugated paper, injection molded plastic or corrugated polyethylene. The advantages of corrugated plastic are that it is strong, lightweight and unaffected by moisture or humidity. Corrugated plastic's relative low cost and ability to be machined on specialized machinery, make it ideal for this application. Corrugated plastic can be mass produced at low cost to meet the volume requirements of a vast market. However, the sleeve could be made from any other existing or future material that has similar properties.

The sleeve preferably has a desired quantity and size of ventilation holes cut out of the appropriate panels to provide airflow for cooling and ripening purposes in desired locations of the assembled box. The sleeve also preferably has two handholds at each end. The purpose of having two handholds is that the box is packed with the bananas crown up and stacked at the plantation with the bananas oriented in this position, meaning that they are shipped in this position. When the bananas leave the ripening rooms, many times the cases are inverted either individually or entire pallets at a time so the bananas are orientated crown down for consumer display; this prevents the need for supermarket personnel to invert each bunch of bananas. Having a mirror image handhold allows the box of bananas to be conveniently carried at both the plantation and at the store level.

The radius on the cut out portion of the handhold is preferably included, as it helps reduce tearing associated with having a cut end on a vertical flute line. Relief may be cut into the length panel that marries to the glue flap so the sleeve can be put over the corner posts on the tray. The size of the sleeve and trays can be easily modified to accommodate different case counts, products and other desirable variables.

With reference to FIG. 4, box or container 10 is made up of two of trays 12, and one sleeve 80. Trays 12 are preferably injection molded from a plastic material having the requisite strength and weight, but could be made of other materials such as metal. As shown in FIG. 1, tray 12 defines sides 38-41. Projecting corner posts 14 are located slightly inside of each corner on the top side 50, at a distance from the edges that is approximately equal to the thickness of sleeve 80. As further shown in FIGS. 1 and 5, each post 14 defines integral sections 16 and 18, one located parallel to each of the edges, and having a length that is approximately related to the length of the side on which it resides; thus section 16 is longer than section 18. Both of sections 16 and 18 have an upper tapered wall portion 20 and a lower vertical wall portion 22. Openings 70 are located just inside of posts 14 and define an open area that is about the size of the area circumscribed by a post, so that the trays can be nested for storage and shipment, as shown in FIG. 7. Trays 12 further comprise four projecting walls or barrier portions 42, one located at about the center of each side of the tray, at the edge.

In the preferred embodiment, tray 12 is about 16 by 20 inches, and posts 14 are about 0.50 inches high. Lower wall portion 22 has a height of about 0.13 inches. Upper wall portion 20 has a height of about 0.37 inches, and is tapered inward at a shallow angle. Barrier portions 42 are about 0.38 inches high and about 4 inches long. Central opening 62 is about 4 by 6 inches. The outer rim of the trays has a thickness of about 0.31 inches, and feet 64 and 65 project below the rim by about 0.19 inches. These dimensions are not critical but are illustrative of a tray that can be used as part of a box for shipping and displaying bananas, as further explained herein.

Sleeve 80 is preferably die cut from 5 mm thick corrugated polypropylene material, and defines handle cutouts 92 and openings 94, both located on the short sides of the assembled sleeve and shown if FIG. 2; more or fewer openings and/or openings on other of the sleeve sidewalls can be used as desired. In a preferred embodiment, there are two sets of handle cutouts 92 at each short side of the assembled sleeve. These mirror-image handle cutouts allow the assembled box to be easily handled regardless of the orientation of the box. When used for bananas, for example, the mirror-image handle cutouts allow the box to be easily handled whether the product is in the "crown up" or "crown down" positions. Assembly is accomplished by gluing the end flaps together to create a joint area. As shown in FIG. 6, the assembled sleeve can be folded flat along score lines 96-99, as desired. When expanded, sleeve 80 defines open ends 82 and 83 that are sized and shaped to fit a tray 12. When box 10 is assembled, trays 12 comprise the bottom and top, and sleeve 80 defines the box sidewalls. One or more strong removable straps of a type known in the art (not shown in the drawings) are used to keep box 10 fully assembled, once the product to be shipped and displayed has been placed into the box.

Box 10 is used as follows. As shown in FIG. 1, a tray 10 is placed on a surface with top 50 facing up. As shown in FIGS. 2 and 3, sleeve 80 is placed edge down on tray 12 such that the sleeve corners are located just outside of posts 14, and the sleeve sidewalls are located just inside of barriers 42. Upper tapered post portions 20 help to guide sleeve 80 into place as it is slipped over the posts, while lower vertical portions 22 help to hold sleeve 80 squared tightly in place. Barriers 42 help to prevent the sleeve sidewalls from bowing outward appreciably when product is placed into the open-top box.

When sleeve 80 is properly located on tray 12, bananas or other product being shipped are placed into the container through open end 82 of sleeve 80, which is the open top of the container. Bananas are placed in the normal shipping position—crown up. When the container is sufficiently filled (typically with about 40 pounds of bananas), a second tray 12 is placed upside down on the open top, with its bottom side 60 facing out, as shown in FIG. 4. One or more straps or other releasable devices that hold the assembly together are then placed, and box 10 is ready to be shipped. Openings 62 and 94 allow for flow of cooling and ripening gases.

For retail display, box 10 is flipped over and placed on a display shelf. The straps are removed. Upper tray 12 and sleeve 80 are removed. This leaves lower tray 12 with product (e.g., bananas) sitting thereon. Store personnel do not need to lift the bananas from the box or turn them upward (crown down) for display. In fact, personnel do not need to handle the bananas in any way.

Once all of the bananas are sold, the empty trays can be stacked and placed on pallets for shipment back to the packing location. Likewise, the sleeves can be folded flat, palletized, and returned for re-use.

The details of the preferred embodiment are not limitations of the claimed invention; rather, they are illustrative of the claimed invention. Other embodiments will occur to those skilled in the art and as such are encompassed by the claims.

What is claimed is:

1. A reusable combined multi-part product shipping box and display tray, comprising:
   (i) a first one-piece molded rectangular plastic tray, comprising:
      (a) a generally planar portion having a generally flat, rectangular surface;
      (b) four sides that define corresponding edges of the planar portion, each side of the four sides defining a corresponding center;
      (c) a set of projecting walls projecting from the surface of the generally planar portion, each projecting wall of the set of projecting walls disposed at a corresponding edge of each corresponding side of the four sides of the planar portion, each projecting wall having a length that is no more than about 25% of a length of the corresponding side and located at about a center of the corresponding side, wherein each projecting wall defines a taper toward a top end of the projecting wall, the top end opposing the rectangular surface, the taper defined by an inner projecting wall surface that is angled outwardly from a vertical reference such that the top end of the projecting wall is more narrow than a base of the projecting wall;
      (d) a corner post disposed at a corresponding corner of a set of four corners of the tray, each corner post spaced inwardly from a first edge and a second edge that define the corresponding corner of the tray, each post comprising two substantially vertical portions that meet at right angles, each vertical portion defining a taper toward a top end of the corresponding vertical portion, the top end opposing the surface, the taper of each vertical portion defined by an outer surface that is angled inwardly from the vertical reference such that the top end of each vertical portion is more narrow than a base of each vertical portion;
   (ii) a second one-piece molded rectangular plastic tray, the second one-piece molded plastic tray being distinct from the first one-piece molded plastic tray, the second one-piece molded plastic tray comprising:
      (a) a generally planar portion having a generally flat, rectangular surface;
      (b) four sides that define corresponding edges of the planar portion, each side of the four sides defining a corresponding center;
      (c) a set of projecting walls projecting from the surface of the generally planar portion, each projecting wall of the set of projecting walls disposed at a corresponding edge of each corresponding side of the four sides of the planar portion, each projecting wall having a length that is no more than about 25% of a length of the corresponding side and located at about a center of the corresponding side, wherein each projecting wall defines a taper toward a top end of the projecting wall, the top end opposing the rectangular surface, the taper defined by an inner projecting wall surface that is angled outwardly from a vertical reference such that the top end of the projecting wall is more narrow than a base of the projecting wall;
      (d) a set of corner posts, each corner post disposed at a corresponding corner of a set of four corners of the tray, each corner post spaced inwardly from a first edge and a second edge that define the corresponding corner of the tray, each post comprising two substantially vertical portions that meet at right angles, each vertical portion defining a taper toward a top end of the corresponding vertical portion, the top end opposing the surface, the taper of each vertical portion defined by an outer surface that is angled inwardly from the vertical reference such that the top end of each vertical portion is more narrow than a base of each vertical portion; and
   (iii) a generally rectangular sleeve having a set of four walls that define four corners, a first opening at a first end of the sleeve and a second, opposed opening at a second end of the sleeve, the set of four walls of the first end of the sleeve engaged with the first one-piece molded rectangular plastic tray and the four walls of the second end of the sleeve engaged with the second one-piece molded rectangular plastic tray to close the first and second openings of the sleeve and form a shipping container,
   the first end of the sleeve is disposed on the surface of the first one-piece molded rectangular plastic tray, the set of four walls of the first end of the sleeve disposed between the set of projecting walls and the set of corner posts such that an outer surface of each wall is disposed against each corresponding projecting wall and an inner surface of each corner of the sleeve is disposed against a corner post of the first one-piece molded rectangular plastic tray to secure the first end of the sleeve to the first one-piece molded rectangular plastic tray, and
   the second end of the sleeve is disposed on the surface of the second one-piece molded rectangular plastic tray, the set of four walls of the second end of the sleeve disposed between the set of projecting walls and the set of corner posts such that an outer surface of each wall is disposed against each corresponding projecting wall and an inner surface of each corner of the sleeve is disposed against a corner post of the second one-piece molded rectangular plastic tray to secure the second end of the sleeve to the second one-piece molded rectangular plastic tray.

2. The reusable combined multi-part product shipping box and display tray of claim 1, wherein the sleeve is foldable into a flat form.

3. The reusable combined multi-part product shipping box and display tray of claim 1, wherein each post defines an opening that is sized and shaped to accept an identical post of another tray, to allow nesting of the trays.

4. The reusable combined multi-part product shipping box and display tray of claim 3, wherein the sleeve defines a plurality of holes in a first wall of the sleeve and in a second wall of the sleeve, the first wall opposing the second wall.

5. The reusable combined multi-part product shipping box and display tray of claim 4, wherein the sleeve defines a first handle cutout in the first wall of the sleeve and a second handle cutout in the second wall of the sleeve, the first handle cutout and the second handle cutout being spaced vertically-aligned.

6. The reusable combined multi-part product shipping box and display tray of claim 5, wherein each tray has an opening in about a center of, and through, the generally planar portion.

7. The reusable combined multi-part product shipping box and display tray of claim 1, wherein each wall of the set of four walls of the sleeve is captured between one projecting wall of the set of projecting walls and two opposing corner posts of the set of corner posts.

8. A box assembly, comprising:
(i) at least one tray, comprising:
(a) a generally planar portion having a generally flat, rectangular surface;
(b) four sides that define corresponding edges of the planar portion, each side of the four sides defining a corresponding center;
(c) a set of projecting walls extending from the surface of the generally planar portion, each projecting wall of the set of projecting walls disposed at a corresponding edge of each corresponding side of the four sides of the planar portion, each projecting wall having a length that is no more than about 25% of a length of the corresponding side and located at about a center of the corresponding side, wherein each projecting wall defines a taper toward a top end of the projecting wall, the top end opposing the rectangular surface, the taper defined by an inner projecting wall surface that is angled outwardly from a vertical reference such that the top end of the projecting wall is more narrow than a base of the projecting wall;
(d) a corner post disposed at a corresponding corner of a set of four corners of the tray, each corner post spaced inwardly from a first edge and a second edge that define the corresponding corner of the tray, each post comprising two substantially vertical portions that meet at right angles, each vertical portion defining a taper toward a top end of the corresponding vertical portion, the top end opposing the surface, the taper of each vertical portion defined by an outer surface that is angled inwardly from the vertical reference such that the top end of each vertical portion is more narrow than a base of each vertical portion; and
(ii) a generally rectangular sleeve having a set of four walls that define four corners, a first opening at a first end of the sleeve and a second, opposed opening at a second end of the sleeve, the set of four walls of the first end of the sleeve configured to engage the at least one tray to close the first opening of the sleeve and form a shipping container,
the first end of the sleeve configured to be disposed on the surface of the at least one tray, the set of four walls of the first end of the sleeve configured to be disposed between the set of projecting walls and the set of corner posts such that an outer surface of each wall is configured to be disposed against each corresponding projecting wall and an inner surface of each corner of the sleeve is configured to be disposed against a corner post of the at least one tray to secure the first end of the sleeve to the at least one tray.

9. The box assembly of claim 8, wherein each wall of the set of four walls of the sleeve is captured between one projecting wall of the set of projecting walls and two opposing corner posts of the set of corner posts.

* * * * *